June 13, 1933. G. A. LUTZ 1,913,713
ELECTRIC WELDING MACHINE
Filed Aug. 22, 1929
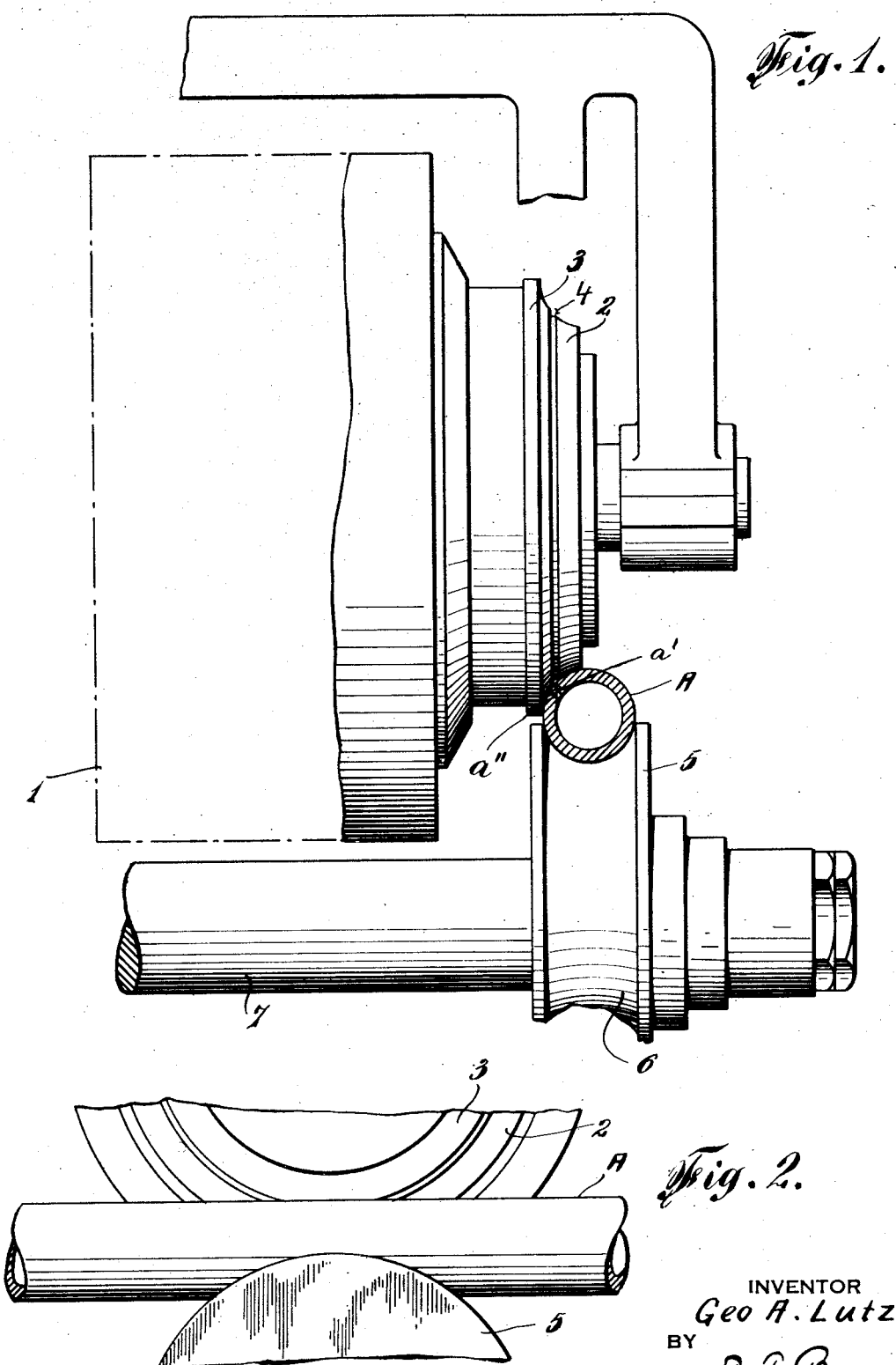
INVENTOR
Geo A. Lutz
BY
T. F. Bourne
ATTORNEY Patented June 13, 1933

1,913,713

UNITED STATES PATENT OFFICE

GEORGE A. LUTZ, OF CRANFORD, NEW JERSEY, ASSIGNOR TO AMERICAN CIRCULAR LOOM COMPANY, INC., OF DOVER, DELAWARE, A CORPORATION OF DELAWARE

ELECTRIC WELDING MACHINE

Application filed August 22, 1929. Serial No. 387,626.

In electric welding of tubing heretofore practiced, so far as I am aware, the edges of a tubular blank at the seam have been radially disposed and abutted and the terminal electrodes of an electric circuit have engaged the tubular blank adjacent to said seam in a perpendicular position over the seam, substantially symmetrically with respect to a vertical diameter through the tube. If a lapped edge seam were presented to such symmetrically disposed electrodes the welded seam at the lapped abutting edges of the blank would vary in the degree of welding because the electric current would not flow evenly at all parts of the metal at the seam, hence an equal welding temperature entirely across the seam would not be produced, with consequent weakness in some parts of the seam of the welded tube.

The object of my invention is to weld tubular blanks having lapped edges at the seams with an even flow of the current through the metal at the seam, whereby the welded seam is rendered more homogeneous and uniform than it would be with symmetrically disposed electrodes.

In carrying out my invention I provide terminal electrodes and guiding means for the work, such as a tubular metal blank, the latter having overlapped meeting edges at the seam, and the electrodes are located adjacent to said seam with a space between the electrodes substantially coincident with a plane through the seam and the electrodes located asymmetrically with respect to a diameter through the blank that is substantially parallel with said plane. One of the electrodes illustrated is of greater diameter than the other to properly engage the blank or tube to press the overlapped edges thereof together during the welding operation. The arrangement described is such that a substantially even distribution of the current from the electrodes through the metal and across the seam will be effected, whereby a strong, uniform and homogeneous welding of the lapped edges of the metal will be produced.

Reference is to be had to the accompanying drawing wherein

Fig. 1 is a side view of a portion of an electric transformer embodying my invention, and Fig. 2 is a detail side view of part of Fig. 1.

At 1 is indicated a portion of a transformer of well known construction of the rotary secondary type. At 2 and 3 are rotary annular terminal electrodes connected with the secondary in a well known way. The said transformer may be of the type set forth in Letters Patent No. 1,478,262, issued Dec. 18, 1923, to Snodgrass and Hunter, or as set forth in Letters Patent to me No. 1,594,891, issued August 3, 1926, the electrodes being of the roller type to engage the blank or work A, shown in the form of a metal tube. The electrodes are suitably spaced apart and insulated from each other, as by interposed insulation at 4. A guide for the work or tube A is indicated at 5, shown in the form of a roller having a peripheral groove to receive the tubular blank A, which guide is carried by a shaft 7 of the transformer in a well known way. The plane of the space between the electrodes illustrated is substantially coincident with a plane through the seam at the abutting edges $a'$, $a''$, and the electrodes are located asymmetrically with respect to a diameter through the blank, such as a vertical diameter therethrough, which diameter is substantially parallel with said plane. As illustrated the central portion of the guide 5 is at one side of the plane between the electrodes, as distinguished from engaging the work on its top portion, as in the aforesaid Letters Patent. The overlapping abutting edges $a'$ and $a''$ of the tubular blank A are angularly disposed with respect to radii of the blank, and preferably substantially in a tangent to a transverse diameter of the tube, so that said edges overlap one another as shown in Fig. 1. The electrode 2, as illustrated, bears against the tube or work A at one side of its vertical diameter, between said diameter and the seam between the edges $a'$ and $a''$, and the electrode 3 bears against the tube on the opposite side of said seam and against a side portion of said tube, whereby the edge portions of the latter are pressed together by the electrodes in overlapped relation.

The abutting surfaces of the overlapped angularly disposed edges of the tube A are longer, for a tube of given gage, than where straight radial edges of a tube are abutted for electric welding, affording a relatively large surface for welding, and by reason of said overlapped edges and the positions of the electrodes adjacent thereto in contact with the metal of the tube, one of the electrodes being of greater diameter than the other, a more even distribution or flow of current between the electrodes and across the seam results than with electrodes symmetrically disposed with respect to a lapped seam. The welded tube described has the advantage of a relatively extensive seam thoroughly welded at the meeting edges, rendering the tube strong and durable and capable of withstanding increased pressures as compared with equal gage tubes having butt-welded straight-edged seams.

Having now described my invention what, I claim is:

1. An electric welding machine provided with spaced annular electrodes, and a guide for a tubular blank to maintain the latter in contact with the electrodes, said electrodes being asymmetrically disposed with respect to a diameter of the blank that is substantially parallel to a plane through the space between the electrodes and a seam of the blank lying in said plane.

2. An electric welding machine provided with spaced annular electrodes, and means to guide a blank to be welded with its seam between overlapped edges of the blank located at one side of a vertical plane through the longitudinal axis of the blank and in register with the space between the electrodes.

3. An electric welding machine provided with spaced annular electrodes, and a guide for a blank to be welded, said guide having its central portion located at one side of a plane passing through the space between the electrodes with the seam of the blank substantially in said plane in register with the space between the electrodes and at one side of said central portion of the guide.

4. An electric welding machine provided with spaced annular electrodes, one electrode being of greater diameter than the other, and means to guide a tubular blank with a side portion thereof in contact with said electrodes at one side of a plane passing through the longitudinal axis of the blank and parallel with the space between the electrodes, the blank having a seam lying in a plane through the space between the electrodes.

5. An electric welding machine provided with spaced annular electrodes, one electrode being of greater diameter than the other, and means to guide a tubular blank with a side portion thereof in contact with said electrodes the blank having a seam lying in a plane between the electrodes at one side of a plane passing through the centre of said means and through the longitudinal axis of the blank, said last named plane being parallel to the first named plane.

GEORGE A. LUTZ.